(12) United States Patent
Steinmetz et al.

(10) Patent No.: US 8,200,291 B2
(45) Date of Patent: Jun. 12, 2012

(54) VEHICLE SAFETY DEVICE FOR REDUCING DRIVER DISTRACTIONS

(76) Inventors: Allan Steinmetz, Newton, MA (US); Douglas Magyari, Royal Oak, MI (US); Stuart Lipoff, Newton, MA (US)

( * ) Notice: Subject to any disclaimer, the term of this patent is extended or adjusted under 35 U.S.C. 154(b) by 943 days.

(21) Appl. No.: 12/178,084

(22) Filed: Jul. 23, 2008

(65) Prior Publication Data
US 2009/0029675 A1    Jan. 29, 2009

Related U.S. Application Data

(60) Provisional application No. 60/961,975, filed on Jul. 24, 2007.

(51) Int. Cl.
*H04M 1/00* (2006.01)
(52) U.S. Cl. .............. 455/569.2; 455/569.1; 455/565; 455/99; 455/117; 340/670
(58) Field of Classification Search ............ 455/565, 455/420, 67.11, 569.2, 404.1, 403, 410, 1, 455/414.1, 63.1, 99, 95, 152.1, 238.1, 297, 455/345, 456.4, 421, 411, 432, 457, 569.1, 455/557, 116, 117; 340/438, 439, 988, 466, 340/5.2, 447, 456, 459, 670; 701/1, 36, 2, 701/14, 65, 70, 48
See application file for complete search history.

(56) References Cited

U.S. PATENT DOCUMENTS

| | | | |
|---|---|---|---|
| 5,682,133 A * | 10/1997 | Johnson et al. ........... 340/426.19 |
| 6,690,940 B1 * | 2/2004 | Brown et al. .............. 455/456.4 |
| 7,123,874 B1 * | 10/2006 | Brennan ......................... 455/1 |
| 2002/0035422 A1 * | 3/2002 | Sasaki ............................ 701/35 |
| 2004/0209594 A1 * | 10/2004 | Naboulsi .................... 455/404.1 |
| 2008/0064446 A1 * | 3/2008 | Camp et al. ................... 455/565 |
| 2008/0268769 A1 * | 10/2008 | Brown et al. ..................... 455/1 |
| 2009/0002147 A1 * | 1/2009 | Bloebaum et al. ............ 340/466 |
| 2011/0109468 A1 * | 5/2011 | Hirschfeld et al. ............ 340/670 |

OTHER PUBLICATIONS

Summary of NCSL Cell Phones and Highway Saftey Update, *Joint Commission on Technology and Science*, printed at http://jcots.state.va.us/pdf/CellPhoneLaws.pdf, 2005, pp. 1-2, downloaded, Jul. 21, 2008.
Employer Cell Phone Liability, *Braun Consulting News*, printed at http://braunconsulting.com/bcg/newsletters/summer2005/summer20051.html#point5, 2005, pp. 1-8, downloaded, Jul. 21, 2008.
Website of Cell Coach, with page entitled, Prevent Teen Drivers from Using Their Cell Phones, printed at http://www.cellcoach.com, pp. 1-10 (including Statement of L. Robert Shelton, Executive Director, National Highway Traffic Safety Adminstration Dated May 9, 2001), downloaded, Jul. 21, 2008.
Michigan Bill Limit Cell Phone Usage, Passengers for Teen Drivers, printed at http://www.insurancejournal.com/news/midwest/2008/03/20/90452.htm, May 30, 2008, pp. 1-2, downloaded, Jul. 21, 2008.

* cited by examiner

*Primary Examiner* — Tan Trinh
(74) *Attorney, Agent, or Firm* — Wolf, Greenfield & Sacks, P.C.

(57) ABSTRACT

A safety device for automotive vehicles (cars, buses and trucks) or rail locomotives. The device inhibits use of cellular telephones and other communication devices that run the risk of distracting a driver/operator while the vehicle is in motion. Several techniques for inhibiting use are described which can be used individually or in a complementary combinations. In one technique, a rapidly varying signal level is created local to the communication device. The variations exceed the operational limits of the system, thereby inhibiting communications. In another technique, the safety device emits radiation that interferes with the reception of signals by the communication device only within the interior of the vehicle and will not interfere with cell phones or wireless devises outside the automotive vehicle or rail locomotive. As another alternative, masking signals also may be generated to prevent signals sent by the communication device within the vehicle from being intelligible at receiving stations outside the vehicle.

22 Claims, 7 Drawing Sheets

VEHICLE SAFETY DEVICE FOR REDUCING DRIVER DISTRACTIONS

CROSS-REFERENCE TO RELATED APPLICATION

This application claims the benefit, under 35 U.S.C. §119(e), of the filing date of U.S. provisional application Ser. No. 60/961,975 entitled "Vehicle Safety Device for Reducing Driver Distractions," filed Jul. 24, 2007 and hereby incorporated herein by reference in its entirety.

FIELD OF THE INVENTION

The invention relates generally to automotive/truck and public transportation (bus, light rail) vehicles and more specifically to safety devices for automotive/transportation vehicles.

BACKGROUND

Use of personal communication devices, such as cellular telephones, Blackberry® wireless devices, wireless personal data assistants (PDAs), text messaging devises and wireless pocket PC's has increased rapidly in the last few years. As usage has increased, new problems have arisen. It is now recognized that use of personal communication devices by drivers of vehicles (car, truck and public transportation alike) increases the risks of vehicular accidents, which cause personal injury, fatalities and loss of personal property worth billions of dollars. For example, drivers having a conversation or text messaging while holding personal communication devices may take their eyes off the road/rails and/or their hands off the vehicle controls in order to make calls or retrieve data/information, thereby impairing their ability to keep their eyes on the road and hands on the steering wheel/controls, and decreasing their ability to react to emergency situations and avoid accidents. To address this problem, some jurisdictions prohibit the use of cellular telephones while driving, unless used with hands-free adapters.

Even with hands-free adapters or Bluetooth® technologies, use of cellular telephones by drivers still increases the risk of accidents. As new research by the National Highway Traffic and Safety Administrations suggests, there is no difference in the level of driver distraction between hands-free operation of a cell phone and hand-held operation of a cell phone. A driver will still become distracted while operating a cellular telephone, leading to operator errors or lengthening reaction time to dangerous road/rail conditions and contributing to traffic accidents, injuries and fatalities. In some instances, distraction is caused by drivers using their hands to perform operations with personal communication devices that are not avoided by hands-free operation. A driver is distracted while dialing the telephone, looking up a phone number or retrieving email, voice messages or text messaging. Alternatively, distraction may result from a driver becoming absorbed in an animated conversation.

Regardless of the specific reason for the distraction, the end result is undesirable. The use of cellular telephones and other communication devices contributes to vehicular accidents, injuries and fatalities. The increased risk of injuries, loss of life and property damage drives up insurance costs.

SUMMARY

According to embodiments of the invention, vehicular safety is improved considerably by creating a safer environment where the driver/operator has greater concentration on the road/rail and fewer distractions by disabling use of cellular phones and other communication devices within the interior cab of the vehicle. Cellular phones and other communication devices may be disabled without interfering with devices outside the vehicle, such as cellular devices in other vehicles or in use on the street. In some embodiments, a communication device is selectively disabled based on the operating state of the vehicle, such as whether the vehicle is in motion or its engine is running. In some embodiments, when the vehicle is stationary or moving, the communications devices are operational.

In one aspect, the invention relates to a device that interferes with operation of communication devices.

In some embodiments, such a device may discriminate between types of use of a communication device and may only interfere with those types of uses that are deemed unsafe. For example, such a device may prevent operation of a cellular telephone or other communication device in a vehicle while the vehicle is in motion, but not while the vehicle is stopped. As another example, such a device may preclude operation of a cellular telephone by a driver of a vehicle, but not by a passenger.

Such a device may interfere with operation of a communication device in any suitable way. In some embodiments, radio frequency (RF) radiation may be used. In other embodiments, a device may detect transmission of a signal from a communication device and generate an audible alert signal to alert a user of the communication device to a potentially unsafe mode of operation. In yet other embodiments, the device may generate an acoustic or other type of signal that interacts with a microphone or other voice signal processing electronics of a communication device, thereby interfering with the communication device's ability to receive voice input, thereby inhibiting the usage of the communications device.

One embodiment of the invention is directed to a method of preventing operation of a communication device. The method comprises causing variations of a level of a signal of the type communicated between the communication device and a base station. The variations limit operation of the communication device.

Another embodiment of the invention is directed to a method of preventing unsafe operation of a vehicle. The method comprises detecting an operating condition of the vehicle associated with unsafe operation of a communication device and, in response to the detected operating condition, controlling a safety device to limit operation of the communication device within the vehicle.

Yet another embodiment of the invention is directed to a safety device that may be used to prevent unsafe operation of a vehicle. The safety device comprises a controller adapted to limit operation of the communication device within the vehicle in response to detection of an operating condition of the vehicle associated with unsafe operation of the communication device.

BRIEF DESCRIPTION OF THE DRAWINGS

The invention will be better understood by reference to the following more detailed description and accompanying drawings in which.

DETAILED DESCRIPTION

To reduce the risks associated with use of communication devices, such as cellular phones, by drivers/operators of vehicles that cause driver distractions and vehicular accidents, it would be desirable to equip vehicles with a safety device that prevents use of communication devices that could distract a driver/operator while a vehicle is in motion. In some embodiments, the safety device prevents use of personal communication devices. As a specific example, a safety device that prevents use of a cellular telephone in a moving vehicle is described.

Such a device may be installed by a company that owns a fleet of cars used by its employees within their maintenance depot. Or, it may be installed by shipping companies or public transportation departments that operate a fleet of trucks, light rail cars or delivery vans within their maintenance depots. However, other applications are possible. For example, the device may be installed in private cars by car owners concerned with young family members driving their cars while distracted by talking on their phones or otherwise using communication devices.

Most public transportation authorities ban cell phone use during operation of vehicles, but have no method of enforcing their rules. Some embodiments of the invention may be used within public transportation systems to enforce compliance with bans on use of cell phones or other portable electronic devices.

In the following text, various embodiments of the invention are described. Some embodiments may not be appropriate for use in all jurisdictions because of government regulation that prohibits interference with certain types of communications. The following description is not intended to describe a specific commercial product, nor is it intended to encourage or induce any party to use a product in any jurisdiction where use of that product is incompatible with government regulations. However, embodiments that are currently incompatible with government regulation may later be used in commercial products if those regulations are changed to prioritize safety concerns over avoiding interference with communications.

Figure 1:
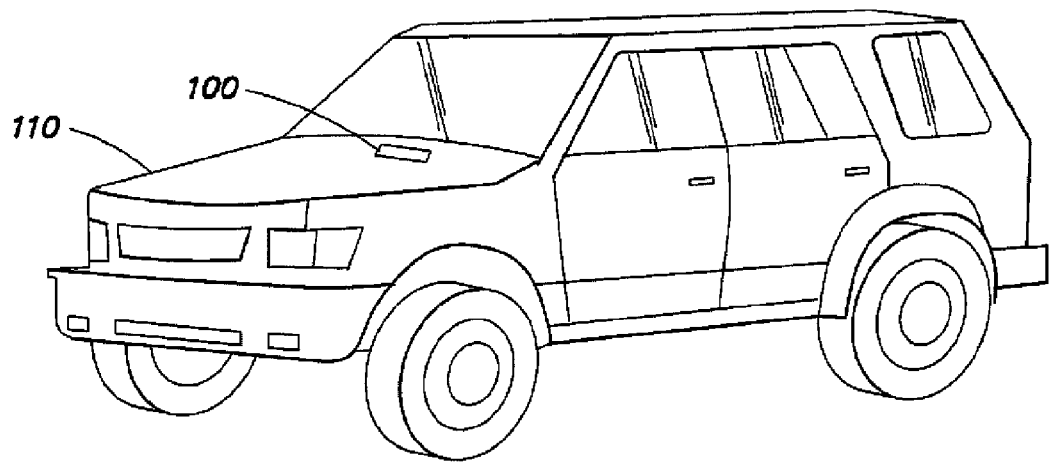
FIG. 1 is an illustration of a vehicle equipped with a safety device according to an embodiment of the invention.

FIG. 1 shows a vehicle 110 that is equipped with a safety device 100. In some embodiments, the safety device is a self-contained unit that may be readily installed in a vehicle. Safety device 100 may be installed in any suitable way at any suitable time. For example, it may be installed as part of the manufacture of vehicle 110 or may be installed as part of a retrofit to an existing vehicle. In the embodiment illustrated, safety device 100 may include a unit that may be installed at low cost.

Safety device 100 may include a case or cover that prevents access to the components making up safety device 100. In this way, safety device 100 may resist tampering that could otherwise disable the safety device.

To further reduce the risk of tampering, safety device 100 may be mounted in a location within vehicle 110 such that it is not readily accessible to drivers that may be tempted to disable it. In some embodiments, safety device 100 may be installed behind a dashboard (not shown) of vehicle 110. However, any suitable mounting location may be used. For example, safety device 100 may be mounted within the engine compartment or behind interior panels forming the ceiling of vehicle 110.

Figure 2:
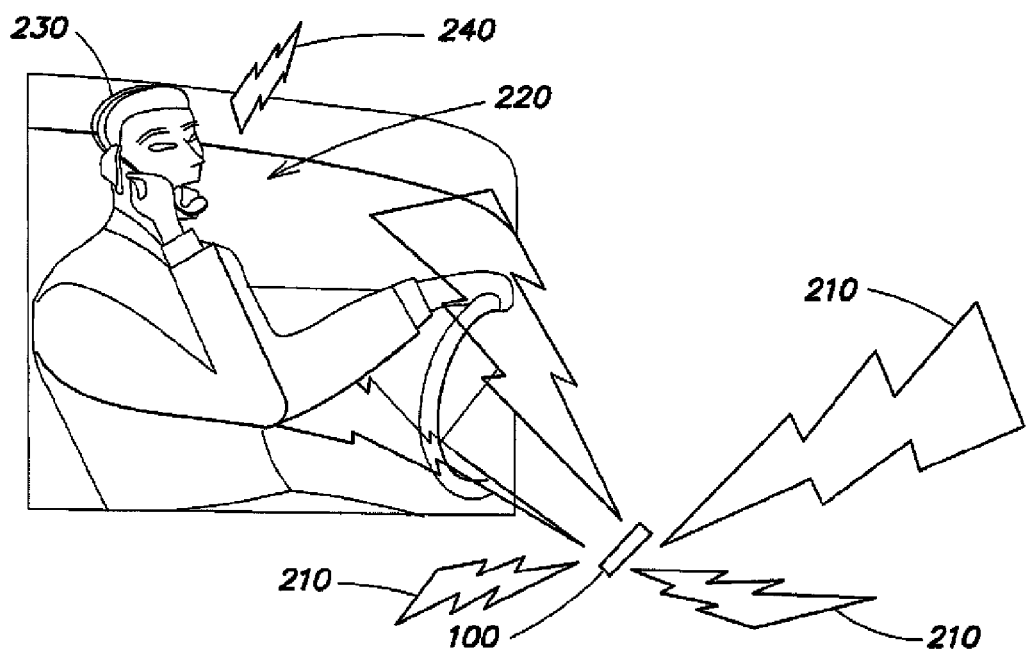
FIG. 2 is an illustration depicting operation of the safety device of FIG. 1.

FIG. 2 is an illustration depicting operation of safety device 100. As shown in FIG. 2, a driver 220 of vehicle 110 is attempting to use a cellular telephone 230. If vehicle 110 is in motion, safety device 100 emits signal 210 that neutralizes the operation of cellular telephone 230.

Signal 210 may be in any suitable form. In some embodiments, signal 210 does not span the full frequency range of a cellular telephone or other communication device to be neutralized. For example, signal 210 may have a frequency spectrum with relatively high power levels which is inband to the RF receiver portion of the communications device. Such a high power signal could exceed the dynamic range limits of the receiver and thereby block the usage of the device. In some embodiments, signal 210 is an RF signal that has a frequency spectrum that is relatively flat over the operating frequency range of cellular telephones such as cellular telephone 230. In other embodiments, signal 210 is in the form of noise. In yet other embodiments, signal 210 may be modulated or otherwise have signal characteristics that mimic those of cellular telephone signals. Another possible approach that utilizes an active RF signal could be a narrow band unmodulated carrier that sweeps through the entire band of the RF receiver in the communications device with a repetition rate that is frequent enough to disrupt the usage of the communications devices. Yet another method might employ the generation of wideband RF noise that spans the receiving frequency band of the communications device and that has the effect of blocking the usage of the device.

Regardless of the specific frequency spectrum of the RF signal, such a signal prevents cellular telephone 230 from acquiring a cellular telephone signal 240 transmitted by a cellular telephone network. Accordingly, user 220 perceives that cellular telephone 230 does not operate inside vehicle 110.

In another embodiment, signal 210 may be transmitted with a radiated power sufficient to neutralize the operation of a cellular telephone or other communication device within vehicle 110. The radiated power level of signal 210 may be set to preclude operation of a cellular telephone or communication device at any point within the passenger compartment of vehicle 110 or at only a subset of locations within the passenger compartment of vehicle 110. For example, the power level of signal 210 may be set only to interfere with a cellular telephone or other communication device operated in the driver seat of vehicle 110.

However, other types of interfering signals may be used. For example, acoustic signals may be used. Such acoustic signals may be audible or inaudible, such as ultrasound signals. In some embodiments, an acoustic signal may interfere with operation of a communication device by acting as a reminder to the user that the device is being operated in a fashion deemed unsafe. Such a warning may deter the user from using the device. In other embodiments, an acoustic signal may interfere with operation of a communication device by overwhelming a microphone, other inputs, or the audio signal processing connected to the microphone of the communication device. Such an embodiment may be implemented with ultrasound or focused, audible acoustic energy that does not create a nuisance for a human operator or animals in the vehicle.

Alternatively, safety device 100 may only emit an interfering signal when a communication device is being used by a driver of vehicle 110. For example, operation of a phone by the driver could be determined by localization of the RF signal from the antenna of a handheld phone within the vehicle. Based on the determined location of the RF signal from the handheld phone, operation of the handheld phone by someone in the driver's seat may be distinguished from operation of the handheld phone by a passenger. Several possible approaches could be used for localization, such as measuring the RF field strength in several antenna sensors in the vehicle and comparing signal strength levels. A convenient place for such antenna sensor(s) could be on the headliner of the vehicle, though any suitable mounting location could be used.

To avoid unintentional interference, the safety device 100 may be designed such that the radiated power level of signal 210 is not so large as to interfere with cellular telephones or other portable communications devices outside of vehicle 110. As is known, the power density of a far field radiated signal matched to free space decreases in proportion to the square of the distance from the radiation source. As is also known to those skilled in the art, it is possible to design an antenna and associated radiating device to generate a very large near field RF signal that decreases much more rapidly then the square of the distance. As is known, such near field signals decrease as the cube of the distance. An alternative embodiment is to design the RF signal to generate a strong near field signal to ensure that the signal level outside the vehicle will be too small to interfere with external communications devices. In some embodiments, safety device 100 emits signal 210 with a radiated power such that the power density at a point approximately eight feet or less from safety device 100 is too low to interfere with the operation of a cellular telephone or other portable communication device.

To further reduce the risk of interference with cellular telephones outside of vehicle 110, vehicle 110 may be equipped with shielding (not shown) that attenuates signal 210 leaving vehicle 110. In embodiments in which signal 210 is an RF signal, the shielding may be EMF shielding. Such shielding may be applied as a grounded film or mesh in body panels, windows or other areas of vehicle 110 where signal 210 could escape from vehicle 110.

In some embodiments, safety device 100 emits signal 210 only when vehicle 110 is in motion or is otherwise in a state deemed unsafe for use of a portable communication device. An alternative to detecting motion could be detecting when the engine is running, allowing usage of communication devices only when the engine is turned off. There are several well known means to detect when the engine is running, including measuring revolutions per minute (RPM) readings from the tachometer sensor. To determine if the engine is running in retrofit applications, one could simply measure the battery voltage on the vehicle direct current bus. When the engine is running, the voltage will be greater by one volt (or more) than when the engine is stopped. In this way, driver 220 may use a cellular phone or other communications device when vehicle 110 is safely parked. Additionally, driver 220 may use a cellular telephone 230 when vehicle 110 is stopped in a traffic jam or pulled off to the side of the road. Any suitable means may be used to determine whether vehicle 110 is in motion. For example, safety device 100 may be connected to systems within vehicle 110 that convey information concerning the operating state of vehicle 110. For example, safety device 100 may be connected to an engine controller over a vehicle bus within vehicle 110. Such a configuration may be desirable when safety device 100 is installed in a vehicle 110 at the time of its manufacture. Alternatively, such a configuration may be appropriate when the manufacturer of vehicle 110 provides information concerning the interfaces to the electronic systems in vehicle 110.

In other embodiments, safety device 100 is designed as a self-contained unit that may be installed after vehicle 110 is manufactured. In such an embodiment, safety device 100 may include a motion detector that determines, independently of the vehicle control system, whether vehicle 110 is in motion.

Figure 3:
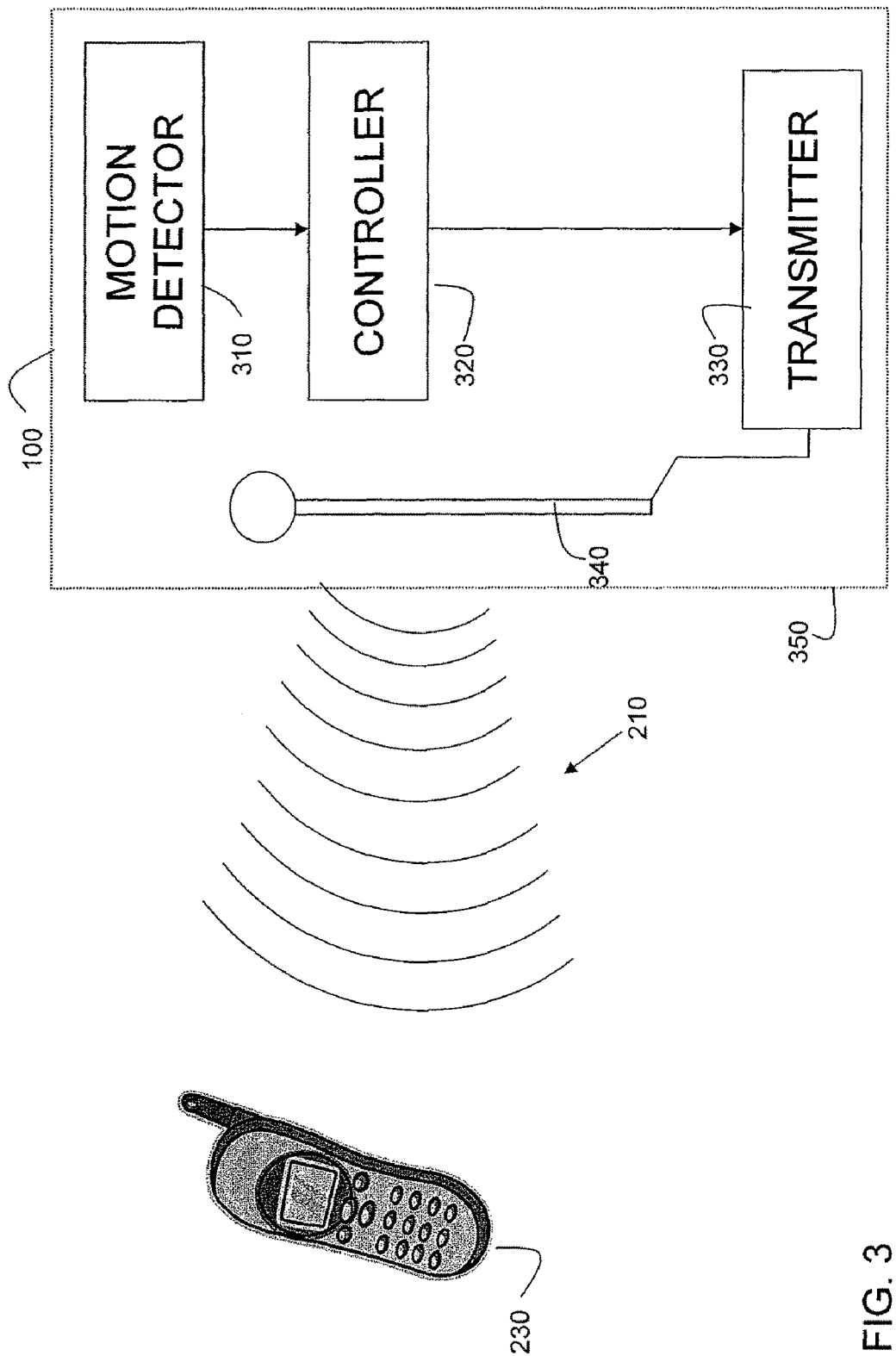
FIG. 3 is a block diagram depicting construction of a safety device according to an embodiment of the invention.

FIG. 3 shows, in block diagram form, an embodiment of safety device 100 including motion detector 310, controller 320 and transmitter 330. Motion detector 310 senses motion of vehicle 110 and provides a status signal to controller 320, indicating when vehicle 110 is in motion. Controller 320 uses the status signal from motion detector 310 to generate control signals for transmitter 330. In the described embodiment, controller 320 controls transmitter 330 to transmit signal 210 when motion detector 310 indicates vehicle 110 is in motion.

Any suitable means for detecting motion of vehicle 110 may be used as motion detector 310. In some embodiments, motion could be detected by an electrical or mechanical connection to the vehicle speedometer, antilock brake system (ABS), or wheel sensors. However, an electrical or mechanical connection could be expensive in a retrofit. For a retrofit situation, a simple accelerometer could be used to detect motion. An accelerometer could be implemented as a discrete device in the form of a weight connected to a strain gauge or a fully integrated device employing nano microelectromechanical system (MEMS) technology could be implemented. Motion detector 310 may be a conventional motion detector, such as is used in inertial navigation systems. Alternatively, motion detector 310 may sense motion of vehicle 110 by measuring and analyzing vibration within vehicle 110. In some embodiments, motion detector 310 may include a digital signal processor (DSP) or other similar semiconductor chip that may be programmed to analyze a signal generated by a vibration sensor. Such a chip may be programmed to detect, in the output of a vibration sensor, a pattern characteristic of vehicle 110 while in motion. Such a signal-processing chip may be programmed to recognize a specific pattern or may be programmed to adaptively recognize a vibrational signature of vehicle 110. Conventional signal processing techniques may be used for adapting a digital signal processor to recognize a vibration pattern characteristic of a moving vehicle.

In some embodiments, a digital signal processor may be employed in conjunction with an inertial navigation sensor, such as an accelerometer. An accelerometer and a digital signal processor may be used together in multiple ways. For example, the output of one could be used to confirm the output of the other, indicating that the vehicle 110 is in motion. Alternatively, the accelerometer could be used to identify periods of time when vehicle 110 is in motion to provide feedback in adapting a digital signal processor to recognize a signature characteristic of vibrations from a moving vehicle.

Regardless of the manner in which motion detector 310 detects motion of vehicle 310, the output of motion detector 310 may be smoothed to avoid having controller 310 turn on and off transmitter 330 at undesired times. For example, it may be desired for safety device 100 to be designed to not emit signal 210 when vehicle 110 is in a traffic jam. When in a traffic jam, vehicle 110 may be driven in a stop-and-go fashion. In such a setting, it may be undesirable for controller 320 to enable transmitter 330 each time vehicle 110 starts in motion for a brief interval. By smoothing the status signal generated by motion detector 310, the status signal may not indicate that vehicle 110 is in motion until the vehicle remains in motion for an uninterrupted period of time that is long enough to indicate that vehicle 110 has cleared the traffic jam. Conversely, when vehicle 110 stops briefly, such as at a stop sign, a traffic light or rail safety signal, it may be undesirable to allow driver 220 to operate cellular telephone 230. Smoothing of the status signal generated by motion detector 310 also avoids this undesired operating condition. With a smoothed status signal, controller 320 may only disable transmitter 330 when the vehicle has been stopped continuously for a period of time sufficient to indicate that vehicle 110 is parked or otherwise standing still long enough to indicate the vehicle is not actively being driven.

The status signal may be smoothed within motion detector 310. Alternatively, if controller 320 is implemented as a processor chip that is programmed with a control algorithm to process inputs from motion detector 310, smoothing of the status signal may occur within controller 320 rather than within motion detector 310.

Controller 320 may be implemented in any suitable manner. In some embodiments, controller 320 is a microprocessor. Though motion detector 310 is shown as separate from controller 320, functions of motion detector 310 may be at least partially implemented using controller 320. For example, analysis of vibration signals may be performed by a processor internal to motion detector 310 and/or by controller 320.

Regardless of the specific implementation of controller 320, controller 320 generates a control signal that selectively enables and disables transmitter 330. Such a signal may be transmitted at any suitable time. For example, such a signal may be transmitted to block a communication device from establishing a connection or may be transmitted at a time to disrupt a connection that has already been established.

Transmitter 330 may be implemented to transmit a signal with the characteristics desired for signal 210. To emit an RF signal, transmitter 330 may be designed using technology as is conventionally used in cellular telephones or other communication devices. Transmitter 330 may include a data source to specify characteristics of signal 210. In embodiments in which signal 210 has characteristics representing noise, the data source for transmitter 330 may be a random number generator. Alternatively, in embodiments in which signal 210 has characteristics intended to mimic a cellular telephone signal, digital information specifying those characteristics may be stored in a computer-readable memory within transmitter 330.

Regardless of the times at which neutralizing radiation signal 210 is generated and its specific characteristics, FIG. 3 shows that transmitter 330 is coupled to antenna 340 from which signal 210 is emitted. As shown in FIG. 3, the entire safety device 100 is enclosed within case 350. Case 350 may be, in whole or in part, transparent to signal 210 such that signal 210 may be emitted through case 350 of safety device 100. Alternatively, antenna 340 may be mounted outside of case 350, whether or not case 350 is transparent to signal 210.

FIG. 3 shows a simplified schematic diagram of safety device 100. Components conventionally found in an electronic system are not expressly shown for simplicity. As one example, conventional components such as a power source are not shown. Power for the components in safety device 100 may be provided by a power supply connected to the power system in vehicle 110. Alternatively, or additionally, a battery or other power source may be employed.

One consideration in developing the safety device 100 is ensuring that signal 210 is of a sufficiently high power density when it reaches a location within the interior passenger cab of vehicle 110 where it is desired to preclude operation of cellular telephone 230 or other portable communication devices. The radiated power level of transmitter 330 may be controlled to establish a sufficiently high power density within vehicle 110, yet a sufficiently low power density outside of vehicle 110.

In a transmitter, control over radiated power is often achieved by controlling the current driven into antenna 340. However, transmitter 330 may control the radiated power level in any suitable fashion. In some embodiments, transmitter 330 may include variable electronic components or other components that can be adjusted to alter the radiated power of signal 210. Such an adjustment may be made when safety device 100 is installed in vehicle 110. The adjustment may be made based on the size of vehicle 110 or the installation location of safety device 100 relative to the anticipated location of a driver/operator of vehicle 110. This adjustment may, for example, be made during installation of safety device 100 by a person adjusting a variable resistor or installing "jumper" wires within transmitter 330. However, any suitable means of providing the desired transmitted power level may be used. For example, different sized transmitters may be available for different styles of installation.

Figure 4:
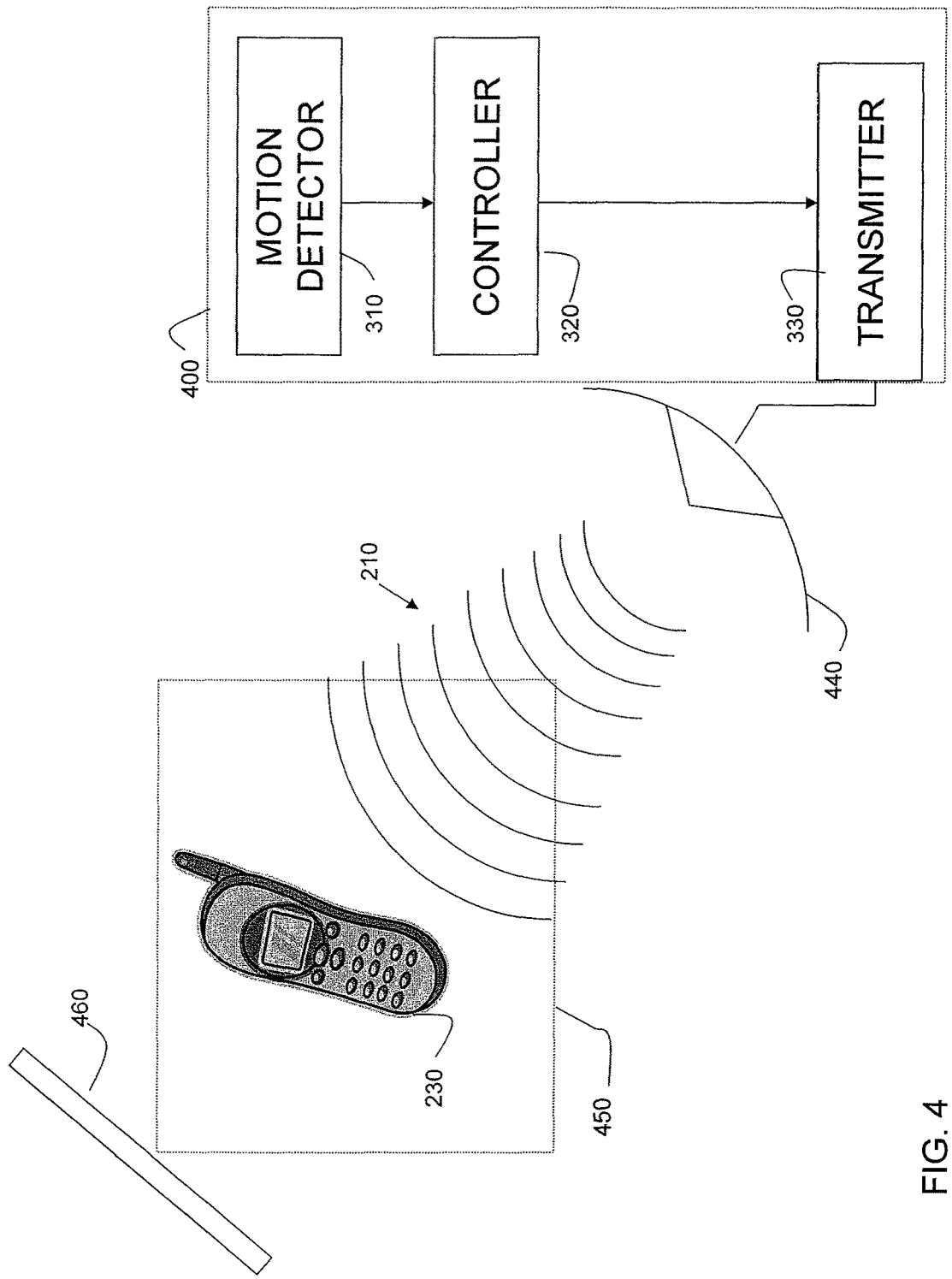
FIG. 4 is an illustration of a safety device according to an alternative embodiment of the invention.

FIG. 4 shows an alternative embodiment of a safety device 400. In the embodiment of FIG. 4, safety device 400 includes a motion detector 310, controller 320 and transmitter 330, as described in connection with FIG. 3. Likewise, safety device 400 includes an antenna for transmitting signal 210. However, in the embodiment shown in FIG. 4, safety device 400 includes a directional antenna. Antenna 440 may concentrate signal 210 in a direction that ensures sufficient radiated power reaches region 450 where operation of cellular telephone 230 is to be neutralized. In the illustration of FIG. 4, region 450 may represent the region around the driver seat of vehicle 110.

Employing directional radiation reduces the possibility that signal 210 will have the undesired effect of precluding operation of portable communications devices outside vehicle 110. In most scenarios, the closest portable communications device outside of vehicle 110 will be to the side of vehicle 110. It is unlikely that a portable communication device will be operated directly above or directly below vehicle 110. Accordingly, directional antenna 440 may direct signal 210 through region 450 in a direction such that it exits vehicle 110 through the top or bottom.

In some embodiments, directional antenna 440 may direct signal 210 through region 450 along a path that exits vehicle 110 at either the front or rear. Though it is probable that portable electronic devices will be operated in front of or behind vehicle 110, such devices will likely be further from region 450 than a device to the side of vehicle 110. If safety device 100 is configured such that signal 210 is attenuated to be below some predetermined threshold when it reaches either the front or rear of vehicle 110, safety device 100 will not interfere with other cellular telephones or other communication devices.

Using a directional antenna may also facilitate the use of absorptive material, such as absorptive material 460. Absorptive material 460 reduces reflections or other emissions of signal 210 from within the vehicle 110. Absorptive material 460 may be material that absorbs radiation in the frequency band over which signal 210 is transmitted. Absorptive material 460 may be any suitable absorptive material, including absorptive materials conventionally used in providing shielding for high-frequency radio systems. While absorptive material may be used to reduce radiation from vehicle 110 regardless of whether a directional antenna is used, when a directional antenna is used, the area that absorptive material must cover to be effective is generally smaller. As shown in FIG. 4, absorptive 460 may be positioned in the path of signal 210 on the opposite side of region 450 from antenna 440.

Figure 5:
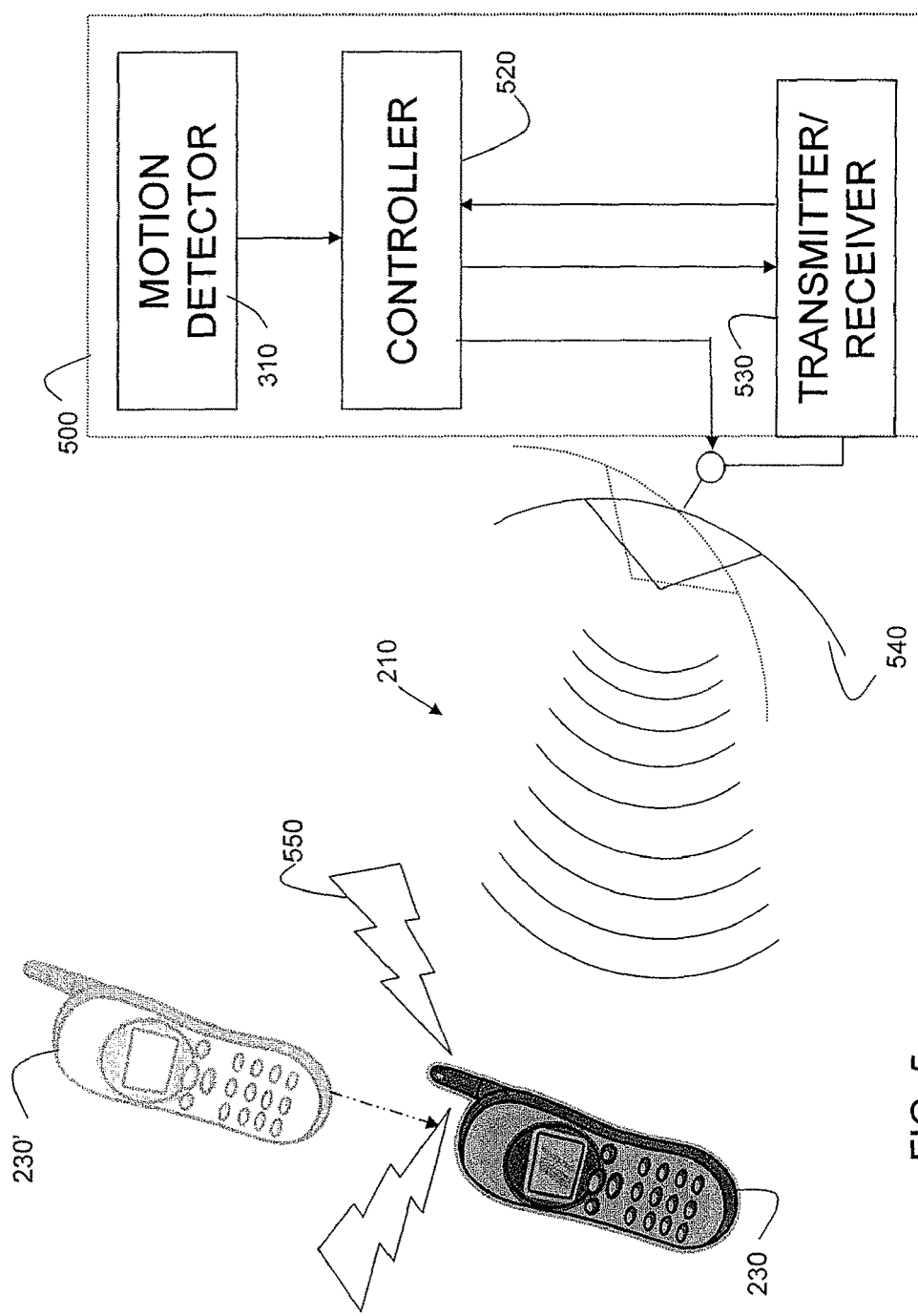
FIG. 5 is an illustration of a safety device according to a further alternative embodiment of the invention.

Turning to FIG. 5, an alternative embodiment of the invention is shown as safety device 500. Many of the components of safety device 500 are similar to components of safety device 100. Safety device 500 incorporates a motion detector 310, which may be as described above in connection with safety device 100 (FIG. 3). Safety device 500 also includes a controller 520. Controller 520 may be implemented with hardware similar to that used to implement controller 320 in safety device 100 (FIG. 3). However, in the embodiment of FIG. 5, controller 520 is programmed to perform additional functions. As shown in FIG. 5, safety device 500 also incorporates a directional antenna 540. As with directional antenna 440, directional antenna 540 emits signal 210 with a directional pattern. Directional antenna 540 differs from directional antenna 440 in that the direction in which neutralizing radiation is emitted is steerable.

Safety device 500 includes a transmitter/receiver 530. Transmitter/receiver 530 may transmit signal 210 having characteristics as described above in connection with safety device 100. In addition, transmitter/receiver 530 is configured to receive signal 550 from a communication device, here shown to be transmitted by cellular telephone 230. Transmitter/receiver 530 may therefore output a status signal to controller 520 indicating that cellular telephone 230 is in use. In some embodiments, controller 520 is programmed to control transmitter/receiver 530 to generate signal 210 only when vehicle 110 is in motion and an occupant of vehicle 110 is attempting to use a cellular telephone or other portable communication device. Accordingly, transmitter/receiver 530 provides another example of a means to control the selective transmission of neutralizing radiation.

Furthermore, transmitter/receiver 530 may be constructed to identify a direction from which cellular telephone or communication device signal 550 is emitted. Receivers that determine the direction of arrival of a signal are used in some communication systems, and a transmitter/receiver 530 of conventional design may be employed. However, any suitable transmitter/receiver may be used.

Transmitter/receiver 530 may provide an indication to controller 520 that it has received signal 550 and an indication of the direction from which that signal was received. Controller 520 may be programmed to generate commands to steerable, directional antenna 540 to direct the antenna toward the source of a received signal 550.

Actively steering neutralizing radiation toward the source of a signal from a cellular telephone or other communication device may allow safety device 500 to operate at a lower radiated power level because a directional beam of signal 210 will have, at any given radius from antenna 540, a maximum power density in the center of the beam. By operating transmitter/receiver 530 in conjunction with directional antenna 540, a transmitting communication device such as cellular telephone 230 will be in the center of the beam even if moved from its location. By adjusting the direction in which a beam of signal 210 is transmitted to keep cellular telephone 230 in the center of the beam, a lower radiated power may be used to achieve the same power density at cellular telephone 230. This capability may be used to increase the amount of interference caused by signal 210 at a communication device, such as cellular telephone 230, without increasing the amount of neutralizing radiation that might escape from vehicle 110 and interfere with other nearby devices.

FIG. 5 illustrates steerable directional antenna 540 as a parabolic dish that physically moves to change the direction in which a beam of signal 210 is emitted. Neither a parabolic shape nor a physically moving antenna is required. For example, a steerable directional antenna may be implemented using electronic beam steering. Such an antenna may include, for example, an array of small antenna elements with little or no directivity. Such an array may be incorporated into a convenient location within vehicle 110, such as stretching across the vehicle dashboard, the vehicle window, or the vehicle roof, or in any other suitable location.

Figure 6:
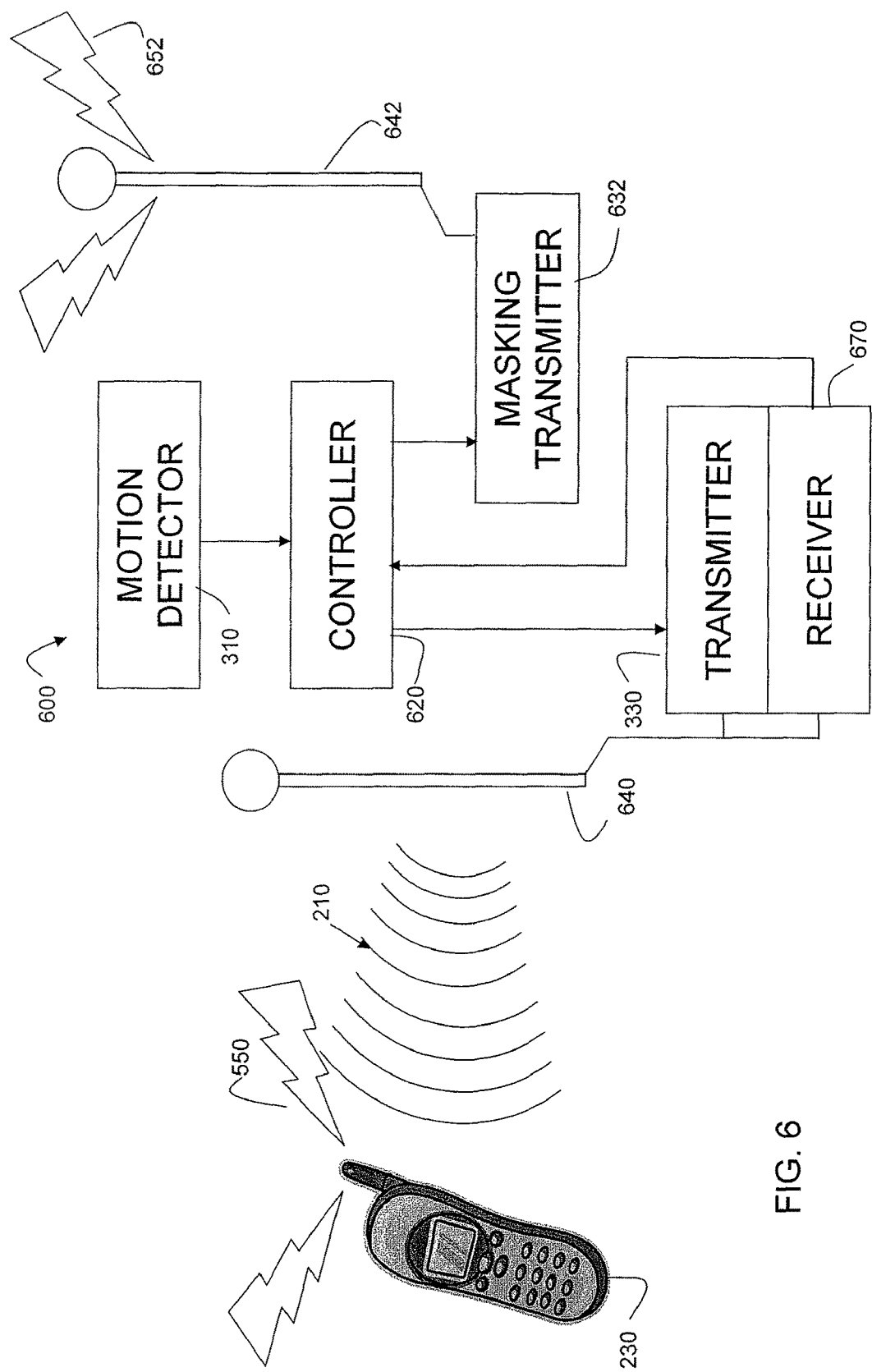
FIG. 6 is a block diagram of a safety device according to a further alternative embodiment of the invention.

Turning to FIG. 6, a further alternative embodiment of a safety device is shown. Safety device 600 includes a motion detector 310 and a transmitter 330, both of which may be as described in conjunction with safety device 100 (FIG. 3). Likewise, safety device 600 includes a controller 620. Controller 620 may be implemented with a processor and may have hardware components similar to controller 320 (FIG. 3). However, in the embodiment of FIG. 6, controller 620 is programmed to perform additional functions to preclude operation of cellular telephone 230 in ways other than simply interfering with signals received at cellular telephone or communication device 230.

FIG. 6 shows an antenna 640 connected to transmitter 330 that generates signal 210. As described above, signal 210 interferes with the reception of signals at a communication device such as cellular telephone 230. Safety device 600 may prevent operation of a communication device by also interfering with signals transmitted from the communication device. To determine when signals are transmitted by a communication device, antenna 640 may also pick up signal 550. As shown, antenna 640 is coupled to receiver 670. Receiver 670 outputs a status signal to controller 620 when it detects that signal 550 is being transmitted by a nearby device.

Controller 620 may use information obtained from receiver 670 to determine characteristics of a signal that would mask transmissions from a communication device, such as cellular telephone 230. For example, controller 620 may extract information on specific frequencies used by cellular telephone 230 and specific codes with messages sent by cellular telephone 230 to determine transmission characteristics of a message that would mimic a message sent by cellular telephone 230. This information may be used to generate content for such a message that disrupts cellular telephone 230 from connecting to the cellular telephone network. Controller 620 may then control masking transmitter 632 to generate a signal in the desired form.

Masking transmitter 632 may couple such a masking signal to antenna 642, which radiates the signal as masking cellular telephone signal 652. By sending such a masking cellular telephone signal, safety device 600 prevents operation of cellular telephone 230 in a second way. For example, masking cellular telephone signal 652 may mimic a user dialing the pound (#) key. Any attempt by a user of cellular telephone 230 to dial a telephone number while inside vehicle 110 will result in a cellular telephone network (not shown) receiving a combination of cellular telephone signals 550 and masking cellular telephone signals 652 that will not represent a valid telephone number. Consequently, the cellular telephone and communication network will not be able to connect the call and the user will be prevented from placing calls from within vehicle 110.

Having thus described several aspects of at least one embodiment of this invention, it is to be appreciated that various alterations, modifications, and improvements will readily occur to those skilled in the art.

For example, a cellular telephone is used as an example of a portable communication device. The invention is not limited to operation on cellular telephones, and embodiments may be constructed that operate on communication devices instead of or in addition to cellular telephones.

As another example, embodiments are described in which an active transmitter and a separate antenna are used to generate a signal 210 that interferes with operation of a communication device. It is not a requirement of the invention that an active transmitter be used. As an alternative, it is possible to employ various means to create a local environment in the vicinity of the cell phone in which there is substantial and rapid time variations (fast fading) in signal levels between the cell phone and the cellular base station. Since the common air interfaces in use (both GSM and CDMA) employ power control loops with defined time constants that require closed loop feedback between the cell phone and the cellular base station, creating such a fast fading environment will inhibit an initial connection as well as force the termination of a connection in progress.

One approach to creating such a fast fading environment could be made fully passive, by placing in the general vicinity of the cell phone (e.g. in the headliner just above the driver) a rapidly time-varying antenna, resonant cavity, or other switchable device that can absorb or reflect energy from the phone. Such a time varying structure could disrupt the closed loop power control between the base station and cell phone and prevent or disable a connection.

Another approach to creating such a local fast fading environment would make use of an active radio frequency amplifier operational in the frequency band(s) employed for cellular communications between an external antenna mounted outside of the vehicle (the donor antenna) and an internal antenna mounted inside the vehicle close to the cell phone. By switching this amplifier on and off at a rapid rate, it would also create a local fast fading environment that will inhibit an initial connection as well as disrupt a call in process.

Figure 7A:
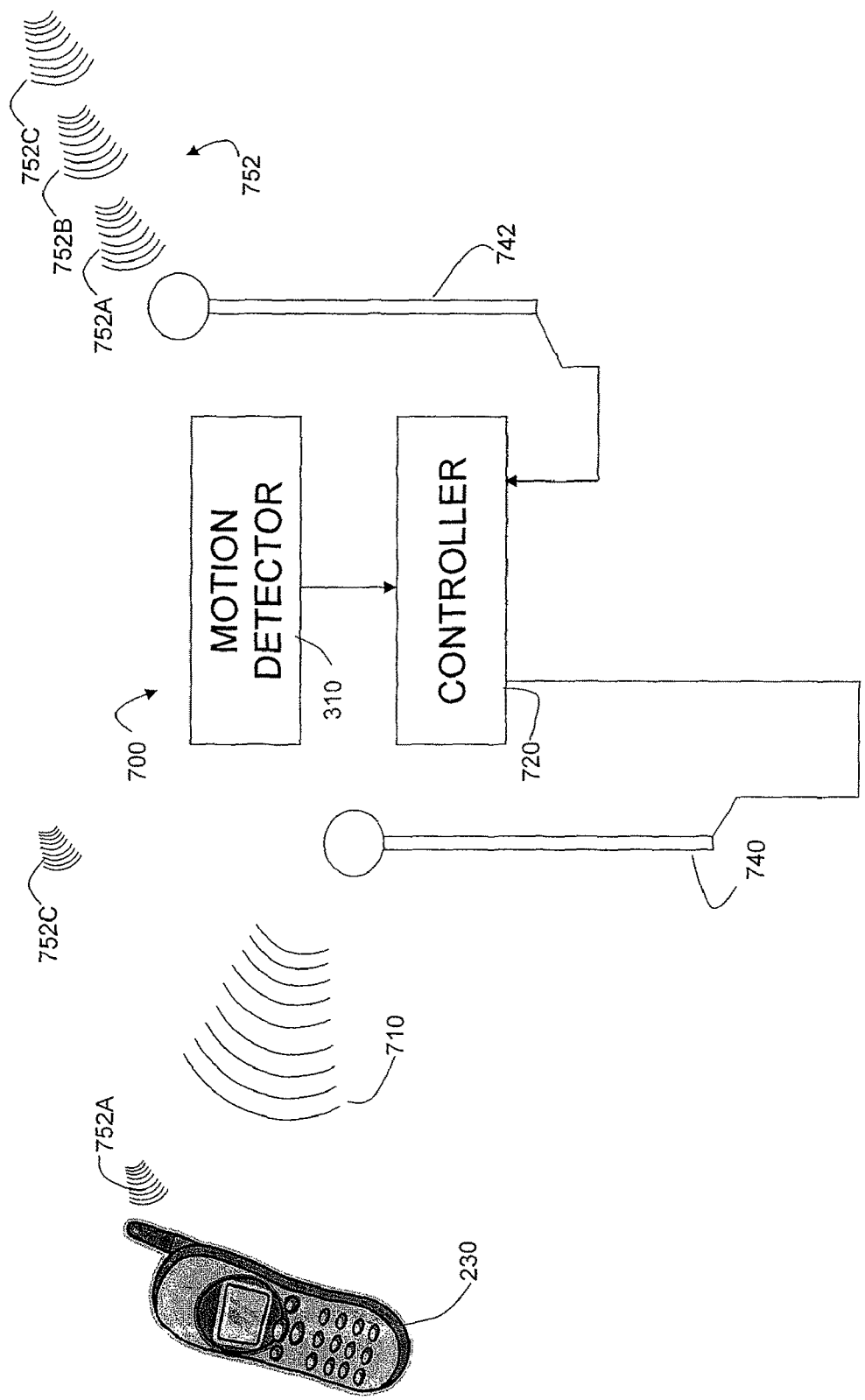
FIG. 7A is an illustration of a safety device according to a further alternative embodiment of the invention.

FIG. 7A illustrates an embodiment in which a fast fading environment is created to limit communications of a communications device. In the embodiment illustrated, a system 700 may be installed in a vehicle. In the embodiment illustrated, cellular telephone 230 may be positioned within the operator area of a vehicle. Antenna 742 may be outside the vehicle, and antenna 740 may be inside the vehicle. For example, for mounting system 700 in an automobile, antenna 740 maybe mounted in the headliner of the car.

A signal 752 from a cellular base station may be incident on the vehicle. As shown, signal 752 is broadcast in multiple intervals, of which intervals 752A, 752B and 752C are numbered. The intervals, in this example, are relative to the operation of system 700. Signal 752 may be a continuous signal or may be a pulsed signal or may exist with any other suitable duration or intervals.

Signal 752 is incident on an antenna 742, which is coupled to controller 720. As in previous embodiments, controller 720 is also coupled to one or more sensors, such as motion detector 310, to ascertain conditions under which operation of a communication device within the operator area is unsafe.

Regardless of the specific mechanism used by controller 720 to determine when operation of a communication device is unsafe or undesired, when controller 720 determines such an operating condition, it may limit the operation of the communication device by creating a fast fading environment for signal 752. A fast fading environment may be created by selectively passing signal 752 in intervals to the interior of the vehicle. For example, the signal may be passed through controller 720 to antenna 740 during interval 752B. The path through controller 720, though passive, may be low attenuation. As a result, inside the vehicle, signal 752 will have a higher level during interval 752B than during intervals 752A and 752C. In this way, a variation occurs between intervals 752A and 752B and again between interval 752B and interval 752C. This pattern of selective variation may be repeated at a sufficiently fast rate to disrupt communication.

FIG. 7A illustrates an embodiment in which a varying signal level is created inside an operator's compartment of a vehicle by selectively passing a signal into the compartment with reduced attenuation in some intervals. A similar pattern of signal levels may be created by selectively absorbing energy of the signal, such as periodically switching on and off a structure in the vicinity of cell phone 230 that absorbs radiation from the signal.

Also, the same effect may be created by passively modulating signal 752 in some intervals. In the embodiment illustrated in FIG. 7B, a fast fading environment is created using a passive modulator that selectively modulates a signal. In system 700', a signal incident on antenna 742 is applied to receiver 732, which is in turn coupled to controller 720. In selected intervals, controller 720 may cause passive modulator 730 to selectively modulate the received signal 752. Through antenna 740, this signal may be incident on cellular telephone 230 as signal 710. In the embodiment illustrated, passive modulator 730 substantially modulates the signal in intervals 752A and 752C. Thus, cellular telephone 230 receives in intervals 752A and 752C the incident signal at the same level as would exist inside the passenger compartment of the vehicle. In interval 752B, cellular telephone 230 receives the signal as it has been received at antenna 742 and passed through passive modulator 730 without significant attenuation. That signal is illustrated as signal 710. Thus, though cellular telephone 230 receives the incident signal, variations between interval 752A and interval 752B, and again between interval 752B and interval 752C, may disrupt operation of cellular telephone 230. Though three intervals are illustrated for simplicity, variations may persist across multiple intervals with a frequency that precludes cellular telephone 230 from tracking the signal variations, thereby precluding or terminating a connection.

Figure 7B:
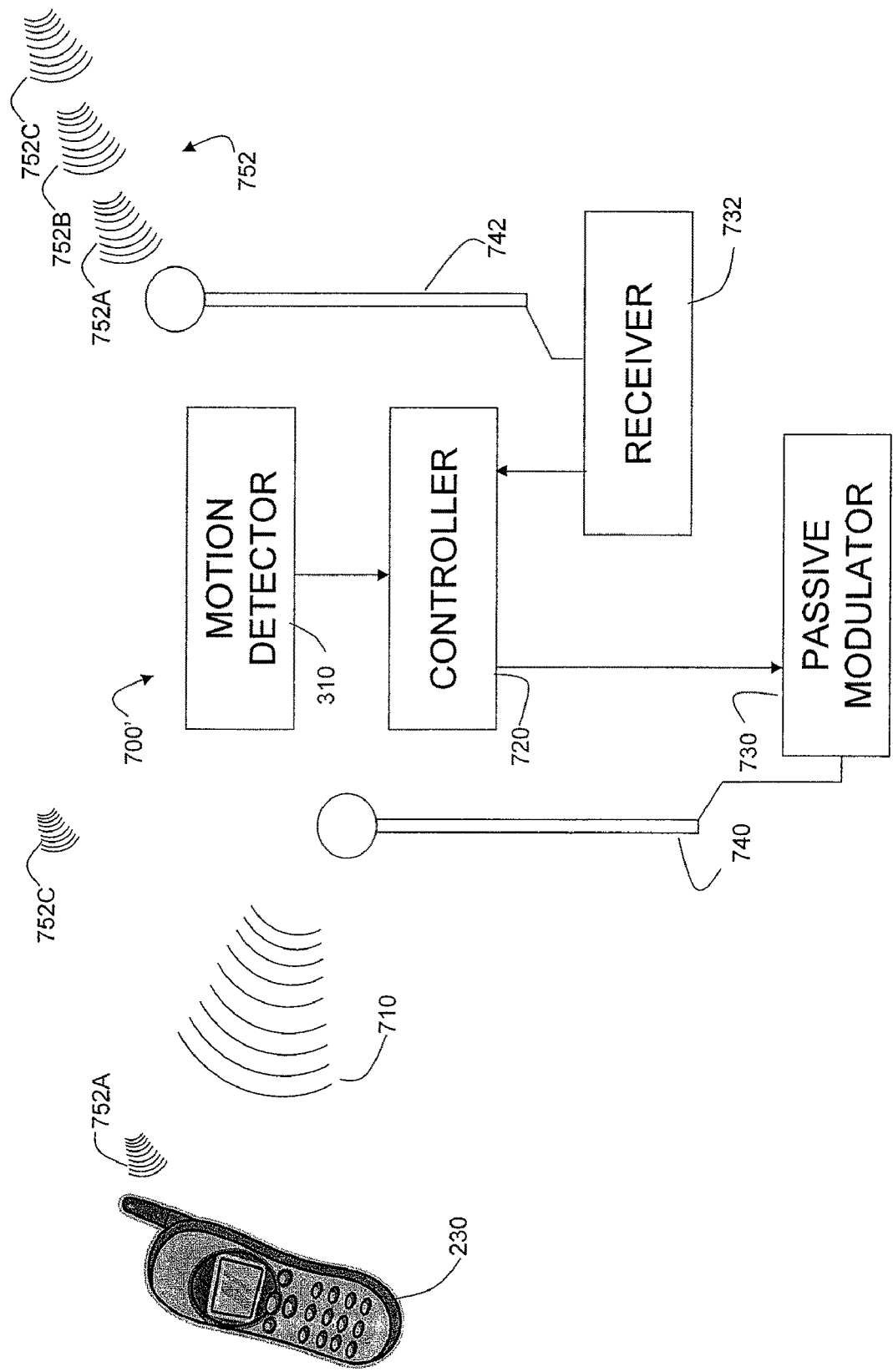
FIG. 7B is an illustration of a safety device according to a further alternative embodiment of the invention.

Though FIGS. 7A and 7B illustrate passive approaches to creating a fast fading environment, a fast fading environment could also be created by amplifying a received signal. For example, in some embodiments, a repeater amplifier may be used in place of or in addition to passive modulator 730. Alternatively, a similar effect may also be provided through the use of antennas that have a gain. For example, antenna 742 and/or antenna 740 may have a higher than unity gain to create a signal at cell phone 230 that varies in amplitude.

Though the above described embodiments create a fast fading environment within an operator's compartment of a vehicle, in some embodiments, communications between cell phone 230 and a base station may be disrupted by causing fast fading of signals emitted by cell phone 230 and are intended to be received by a base station.

Regardless of whether the fast fading is created in signals passing to or from cell phone 230, any suitable fast fading environment may be created. For example, in a fast fading environment, signals in the frequency range used by the communication device may be varied at least 7 dB at a rate that is at least 300 Hz. As a specific example, testing performed on a commercial CDMA phone in the 1900 MHz range has demonstrated that signal levels varying on the order of 10 dB at a 400 Hz rate are effective in causing a call in process to be forced terminated.

Because the creation of a local fast fading environment with either the active or passive approach described above does not involve the generation of any signals, it would likely not fall under current Federal Communications Commission (FCC) rules and regulations (47 CFR Part 15) that might otherwise prohibit the generation of an interfering signal, as described below.

In the United States, the FCC regulates manufacturing, use, and sale of devices that generate RF energy. Current FCC regulations may prohibit the use of means which jam cellular transmissions where these means actively generate RF energy. The Communications Act of 1934 as amended also has current provisions that make it a crime to interfere with the operation of a common carrier service. It is not clear if this Communications Act might further limit means that inhibit the use of cell phones, even when such use may be dangerous. Other US Government Agencies such as The National Highway Transportation Safety Administration (NHTSA) are currently exploring the need for inhibiting dangerous usage of cell phones while driving, which could result in changes to either FCC Rules, The Communications Act, or both. Because the legal and regulatory situation should be regarded as capable of being modified it is important to have a variety of alternative means to inhibit dangerous operation of cell phones while driving. Some of the alternative means may be capable of being implemented under today's legal framework while other concepts may require changes in rules or the law. In order to allow for immediate deployment of solutions that may be legal today, this patent application describes a number of alternative means that might be implemented in stages as either the regulators and/or the law changes.

Some or all of the techniques described herein may be allowable in view of current regulations, such as the FCC regulations described above. Moreover, such regulations are subject to change and may become more permissive with respect to interfering with cell phone usage in the future as result of safety waivers. Thus, even techniques not presently allowable may become allowable in the future. Of course, the regulations described above do not apply worldwide. Thus, even if prohibited in the United States, the techniques described herein may advantageously be applied to the use and manufacture of devices operated in other international jurisdictions.

If an active device is used, examples of signals that could be generated include wideband RF noise to block the handset receiver, strong continuous wave (CW) carriers inband of the operation of the phone so as to saturate the receiver front end dynamic range of the phone, an RF sweep signal that loops repeating at a rapid rate over the receiver band of interest, and a comb filter generator of a picket fence of RF products that cover each channel in the handset receiver.

As yet another example, a motion detector is described as generating status signals used in a controller to determine whether a vehicle is in motion. Such a motion detector may directly measure motion, such as by sensing vibration caused by motion of the vehicle. A safety device may also enable or disable the generation of neutralizing or masking signals based on other input that can indicate whether it is acceptable for a driver of a vehicle to operate a cellular telephone. For example, the system may enable or disable the transmission of interfering signals based on detecting that the vehicle motor is running or that the vehicle power system is energized.

As further example, the safety device may be equipped with one or more override capabilities that suppress transmission of neutralizing radiation and/or masking radiation under controlled conditions even if a vehicle containing the safety device is moving. For example, the device may include a keypad through which a user may enter a pass code to disable the device or a similar key chain security device that is used to arm and disarm security systems in vehicles. Alternatively, the safety device may include a receiver capable of receiving a coded command signal to selectively suppress such transmissions. This feature may, for example, be useful when the owner, such as a parent who loans a car to a young family member or an employer that provides vehicles for use by its employees, generally does not want drivers to use personal communication devices but wants to retain the capability to reach drivers in exceptional circumstances.

Further, though the invention is illustrated by examples showing cellular telephones/texting devices, the invention is not so limited. It may be desirable to neutralize operation of any communication device that has the possibility to interfere with safe operation of a vehicle and cause driver visual distractions or operating heavy machinery/equipment, public transportation vehicles such as light rail and or buses.

In addition, though the invention is illustrated by examples showing vehicles, the invention is not so limited. The principles described herein may be applied to other environments in which the use of cell phones/texting devices or other communication devices is undesirable or undesirable under certain conditions. For example, the principles described herein may be used to limit operation of communication devices in theaters, houses of worship, funeral homes, or other buildings or locations. Use of communication devices in such venues may optionally be limited only during the occurrence of certain conditions. Examples of such conditions include, for example, a movie in progress at a movie theater or a service in progress at a place of worship or a funeral home. Thus, it should be appreciated that the "safety device" described herein may be used to prevent undesirable uses of communication devices and not merely to prevent unsafe uses.

Also, functions are described as being implemented in specific portions of the safety device. Any function of the device may be implemented in any desired hardware component. For example, control for a steerable antenna is described to be performed by the controller for the safety device. Other implementations are possible. For example, control of the steerable antenna may be performed by a feedback loop in the receiver, which can operate to steer the antenna in a direction that maximizes received power level.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that performs particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of selectively limiting operation of a communication device within a vehicle, the communication device being configured to communicate information by sending or receiving information to or from a remote device using a type of signal, the method comprising:
   detecting an operating condition of the vehicle; and
   in response to the detected operating condition, controlling a device to limit operation of the communication device within the vehicle,
   wherein controlling the device comprises controlling the device to modify a signal of the type of signal used by the communication device to vary in amplitude and at a frequency so as to exceed the operational limits of the communication device.

2. The method of claim 1, wherein the vehicle comprises an automotive vehicle or a rail locomotive.

3. The method of claim 1, wherein the condition comprises motion of the vehicle.

4. The method of claim 1, wherein the condition comprises operation of an engine of the vehicle.

5. The method of claim 1, further comprising detecting an attempted operation of the communication device within a driver area of the vehicle;
   wherein controlling the device comprises focusing energy within the driver area in response to the detected operating condition and the detected attempted operation of the communication device.

6. The method of claim 1, wherein controlling the safety device comprises controlling the device to limit operation of the communication device in only a first portion of a passenger compartment of the vehicle, the first portion including an operator's seat.

7. The method of claim 6, wherein controlling the device comprises directing a signal toward the first portion of the passenger compartment such that the signal limits operation of the communication device in the first portion of the passenger compartment and does not limit operation of the communication device in a second portion of the passenger compartment.

8. The method of claim 1, wherein controlling the device further comprises controlling the device to modify the radio frequency signal so as not to interfere with operation of communication devices that are outside the vehicle and of the same type as the communication device.

9. The method of claim 1, wherein controlling the device comprises controlling the device to modify the signal of the type used by the communication device to vary in amplitude by at least 7 dB at a rate faster than 300 Hz.

10. The method of claim 1, wherein limiting operation of the communication device within the vehicle comprises blocking communication with a base station.

11. A device to selectively limit operation of a communication device within a vehicle, the communication device being configured to communicate information by sending or receiving information to or from a remote device using a type of signal, the device comprising:
   a controller adapted to limit operation of the communication device within the vehicle in response to detection of an operating condition of the vehicle; and
   a device,
   wherein the controller is adapted to control the device to cause variations of a level of a signal of the type of signal used by the communication device, wherein the variations create a fast fading environment that limits operation of the communication device within the vehicle.

12. The safety device of claim 11, further comprising a motion detector coupled to the controller, the motion detector adapted to detect motion of the vehicle;
   wherein the operating condition comprises motion of the vehicle detected by the motion detector.

13. The safety device of claim 12, wherein:
   the device comprises a radio frequency transmitter coupled to the controller; and
   the controller is adapted to cause the radio frequency transmitter to generate radio frequency signals sufficient to limit operation of the communication device in response to detection of the operating condition of the vehicle associated with unsafe operation of the communication device.

14. The safety device of claim 11, wherein the controller is adapted to limit operation of the communication device in response to detection of the operating condition of the vehicle that is associated with unsafe operation of the communication device.

15. The safety device of claim 11, further comprising:
a steerable directional antenna coupled to the controller; and
a transceiver coupled to the controller and adapted to identify a direction from which a signal from the communication device is received and provide an indication of said direction to the controller; and
wherein the controller is adapted to steer the antenna toward said direction in response to the indication of said direction.

16. The safety device of claim 11, wherein:
the device comprises an amplifier;
wherein the controller is adapted to control a level of signal passing through the amplifier to cause variations of a level of a signal of the type received by the communication device from a cellular base station, wherein the variations create a fast fading environment that limits operation of the communication device within the vehicle.

17. The safety device of claim 11 in combination with a vehicle comprising:
a detector adapted to detect an operating condition of the vehicle associated with unsafe operation of a communication device.

18. The vehicle of claim 17, wherein the controller is adapted to cause variations of a level of a signal of the type received by the communication device from a cellular base station, wherein the variations limit operation of the communication device within the vehicle.

19. The vehicle of claim 18, wherein the variations are sufficiently rapid so as to disrupt a power control loop between the communication device and the cellular base station and thereby prevent or disable a connection between the communication device and the cellular base station.

20. The device of claim 11, wherein limiting operation of the communication device comprises blocking communication with a base station.

21. A device to selectively limit operation of a communication device within a vehicle, the communication device being configured to communicate information by sending or receiving to or from a remote device a type of signal, the device comprising:
a controller adapted to limit operation of the communication device within the vehicle in response to detection of an operating condition of the vehicle; and
a passive device;
wherein the controller is adapted to switch a state of the passive device to cause variations of a level of a signal of the type used by the communication device, wherein the variations comprise increases and decreases of the signal level that limit operation of the communication device within the vehicle.

22. The device of claim 21, wherein limiting operation of the communication device comprises blocking communication with a base station.

* * * * *